UNITED STATES PATENT OFFICE 2,558,559

VULCANIZATION OF SYNTHETIC RUBBERS WITH BORON HYDRIDES

Dallas T. Hurd and Moyer M. Safford, Schenectady, N. Y., assignors to General Electric Company, a corporation of New York No Drawing. Application September 12, 1950, Serial No. 184,527

14 Claims. (Cl. 260—83.3)

This invention is concerned with the vulcanization of synthetic rubbers. More particularly, the invention relates to a method of vulcanizing a synthetic rubber selected from the class consisting of rubbery copolymers of a butadiene and acrylonitrile, and polymers of 2-chlorobutadiene-1,3 or polymers of chloroprene (also known as neoprene) by the use of a boron hydride.

Rubbery polymers of chloroprene have been disclosed in the literature as, for example, in U. S. Patent 1,950,432, Carothers et al., issued March 13, 1934. Such rubbery polymers are vulcanizable by the use of sulfur or sulfur-containing vulcanizing agents. Another polymeric material which is also vulcanizable by means of sulfur comprises copolymers of butadiene, for example, butadiene-1,3 and acrylonitrile. The latter copolymers are more particularly disclosed in U. S. Patent 1,973,000 issued September 11, 1934.

We have now discovered that the two above-described polymeric materials, namely, the polymeric chloroprene and polymeric composition of matter comprising a butadiene (e. g., a butadiene having the general formula

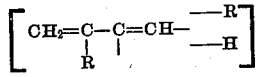

where R is a member selected from the class consisting of hydrogen or methyl radical, e. g., butadiene-1,3, 2-methyl pentadiene-1,3, etc.) and acrylonitrile (which may be present in broad proportions, e. g., from 10 to 90%, preferably from 15 to 60% of the total weight of the acrylonitrile and butadiene) may be vulcanized with an entirely new class of compounds at temperatures which are generally lower than those required by the usual vulcanizing agents and that the vulcanization of these polymers in accordance with our invention results in certain advantages, e. g., improved tensile strength and elongation. More particularly we have discovered that the class of vulcanizing agents comprising a boron hydride in small amounts tends to effect vulcanization of polymeric 2-chlorobutadiene-1,3 and copolymers of a butadiene and acrylonitrile where the acrylonitrile may vary in wide proportions depending on the properties of the copolymer desired.

In accordance with our invention we incorporate in the particular polymers employed and described above a minor proportion, e. g., a small amount of the order of from about 0.01 to 3% by weight, of a boron hydride. The term "boron hydride" employed in the specification and in the appended claims is intended to include compounds of boron containing boron and hydrogen atoms, for example, decaborane ($B_{10}H_{14}$), hexaborane ($B_6H_9$), pentaborane ($B_5H_9$), etc., as well as complexes of the boron hydride, for example, the ammonia complex of a boron hydride, for instance, $B_2H_5 \cdot 2NH_3$, other complexes of boron hydrides with other materials, for example, complexes of decaborane plus hexamethylenetetramine, complexes of decaborane plus p,p'-diaminodiphenylmethane, etc., organic derivatives of boron hydrides, e. g., diphenyl decaborane, dimethyl diborane, etc. It will, of course, be apparent that other solid, liquid, etc., boron hydrides or derivatives thereof may be employed without departing from the scope of the invention. For optimum heat resistance, it is desirable that the amount of boron hydride employed as the vulcanization accelerator be maintained within the limits described above. It is, of course, apparent that larger amounts may be employed.

The manner of practicing our invention may be varied. The mixture of ingredients is preferably formed into a homogeneous moldable mass by the use of rubber milling rolls. Thereafter, the milled mass may be placed in a suitable mold and treated under pressures varying, e. g., from 250 to 1500 p. s. i., for from 10 to 90 minutes at temperatures ranging from about 100 to 150° C. These conditions, of course, may be varied or extended depending on the polymer, catalyst, application, etc.

In order that those skilled in the art may better understand how the present invention may be practiced, the following examples are given by way of illustration and not by way of limitation. All parts are by weight.

EXAMPLE 1

In this example a copolymer of butadiene-1,3 and acrylonitrile in which the nitrile content was about 26% (sold by the Enjay Corp. under the trade name "Paracril") was vulcanized with varying amounts of decaborane while as a control the same copolymer was vulcanized with the usual sulfur type vulcanizing agents employed for the purpose. The ingredients described below were mixed together on the usual differential rubber rolls used in milling synthetic rubber. A typical formulation used in this work comprised as follows:

100 parts copolymer of butadiene and acrylonitrile
45 parts carbon black (Thermex)
5 parts zinc oxide
1 part stearic acid
1.5 parts coal tar
1.5 parts of a wax (lubricating agent)

To this mixture in one test was added 0.5 part $B_{10}H_{14}$ and 9.5 parts calcined clay (to reduce flammability of the $B_{10}H_{14}$). Another formulation was prepared of the above-identified ingredients but instead of the boron hydride there was added the usual mixture of sulfur-bearing accelerators including 3 parts sulfur, 1.25 parts Altax (benzothiazyl disulfide) and 0.25 part diphenylguanidine. Representative samples containing the boron hydride were cured at a temperature of about 100° C., while other samples containing the sulfur-bearing accelerators were cured at 150° C. which was found to be the optimum temperature by various tests. The molding was done at about 500 p. s. i. to give a sheet which could be tested for its properties. The following table shows the tensile strengths and per cent elongations of the various samples.

*Table I*

| Cure Accelerator | Temp., °C. | Minutes | Per Cent Elongation | Tensile, p. s. i. |
|---|---|---|---|---|
| $B_{10}H_{14}$ | 100 | 10 | 800 | 1,300 |
|  | 100 | 40 | 720 | 1,900 |
|  | 100 | 80 | 700 | 2,320 |
| Sulfur-accelerator | 150 | 10 | 125 | 1,780 |
|  | 150 | 40 | 100 | 1,875 |
|  | 150 | 80 | 80 | 1,800 |

EXAMPLE 2

In this example different copolymers of butadiene-1,3 and acrylonitrile (filler was omitted) in which the acrylonitrile content varied (for example, 18%, 26%, and 35% of the total weight of the latter and the butadiene) were prepared. These were cured or vulcanized in the same manner as in Example 1 with the exception that in one case a vulcanized sample was prepared using 100 parts of the copolymer, 0.1 part $B_{10}H_{14}$, and 1.9 parts calcined clay. In the other case, for each 150 parts of the specific copolymer of the butadiene and acrylonitrile employed, there were added 4.5 parts sulfur, 1.9 parts benzothiazyl disulfide, and 0.4 part diphenylguanidine, the mixture being vulcanized similarly as in Example 1 at 125° C. As was the case in Example 1, each formulation was thoroughly mixed on rubber differential rolls until a homogeneous sheet was obtained and the respective sheets molded at the above stipulated temperature at a pressure of about 500 p. s. i. in a mold capable of giving a sheet which could be used in testing the various samples. The following Table II shows the percents elongation and tensile strengths of each of the samples.

*Table II*

| Cure Accelerator | Per cent Acrylonitrile | Cure Time, Minutes | Per cent Elongation | Tensile, p. s. i. |
|---|---|---|---|---|
| $B_{10}H_{14}$ | 18 | 10 | 290 | 260 |
|  | 18 | 40 | 290 | 340 |
|  | 18 | 80 | 300 | 375 |
|  | 26 | 10 | 600 | 470 |
|  | 26 | 40 | 630 | 660 |
|  | 26 | 80 | 700 | 650 |
|  | 35 | 10 | 850 | 700 |
|  | 35 | 40 | 720 | 840 |
|  | 35 | 80 | 590 | 710 |
| Sulfur Accelerator | 18 | 10 | 490 | 300 |
|  | 18 | 40 | 280 | 430 |
|  | 18 | 80 | 300 | 300 |
|  | 26 | 10 | 1,000 | 490 |
|  | 26 | 40 | 280 | 420 |
|  | 26 | 80 | 140 | 210 |
|  | 35 | 10 | 1,200 | 490 |
|  | 35 | 40 | 375 | 460 |
|  | 35 | 80 | 200 | 250 |

EXAMPLE 3

In this example, polymeric 2-chlorobutadiene-1,3 (known as neoprene) was mixed with carbon black as a filler and with either the usual sulfur accelerator or with decaborane as cure accelerator. The formulation for these materials was as follows:

|  | Sample 1 | Sample 2 |
|---|---|---|
|  | *Parts* | *Parts* |
| Neoprene | 100.0 | 100 |
| Reogen (Mixture of oil-soluble sulfonic acid and paraffin oil as softener) | 2.0 | 2 |
| Channel Black | 75.0 | 75 |
| Agerite-Stalite (Heptylated diphenylamine as anti-oxidant) | 2.0 | 2 |
| MgO | 4.0 | 4 |
| ZnO | 5.0 |  |
| Benzothiazyl disulfide (Altax) | 6.75 |  |
| Stearic Acid (Lubricant) | 0.5 |  |
| Calcined clay (Whitex) |  | 1.9 |
| $B_{10}H_{14}$ |  | 0.1 |

Each of the samples was milled and cured for varying times at 150° using the procedure described in Examples 1 and 2, and the percents elongation and tensile strengths determined in each case at different points during the vulcanization. The following Table III shows the results of these tests.

*Table III*

| Sample No. | Cure Time, Minutes (150° C.) | Per Cent Elongation | Tensile, p. s. i. |
|---|---|---|---|
| 1 | 10 | 420 | 1,400 |
|  | 40 | 540 | 1,650 |
|  | 80 | 410 | 1,600 |
| 2 | 10 | 520 | 1,850 |
|  | 40 | 410 | 1,940 |
|  | 80 | 390 | 1,900 |

It will, of course, be apparent to those skilled in the art that various modifying agents including various other fillers such as, for example, titanium dioxide, lithopone, various clays, iron oxide, etc., including other plasticizers and other modifying ingredients, for instance, other rubbers or resins both synthetic and natural resins, may be added without departing from the scope of the invention.

In addition it will be apparent to those skilled in the art that other types of polymers or copolymers of the previously described class, as well as the amount of boron hydride may also be varied without departing from the scope of the invention. Other boron hydrides, many examples of which have been given previously, may also be used in place of the decaborane employed in the foregoing examples. Finally, the various conditions disclosed in the foregoing examples, for example, times of heating, temperature, concentrations of ingredients, etc., may be varied at will, depending upon the application involved and depending upon the properties desired in the final product. The exact procedure in milling or molding the claimed compositions of matter may, of course, be varied using the different procedures now well known in the art, especially in the rubber art, and it is not believed necessary to give any more specific directions for such procedures, since, as will be apparent, they will vary, depending upon such factors as the application intended, properties desired in the final product, etc.

Our invention is useful and has particular application in places where butadiene-acrylonitrile and chlorobutadiene rubbers are ordinarily used, as, for instance, in electrical insulation, clothing, protective purposes, etc. Advantage can be taken of the increased tensile strength obtainable by means of the use of our class of vulcanization accelerators. In addition, economic advantages are realized in that the vulcanization temperature of these two classes of rubbers can be reduced with obvious savings in cost.

Although the boron hydrides are eminently suitable for vulcanizing chloroprene and butadiene-acrylonitrile rubbers, we have also found that some vulcanizing effect is obtained when a boron hydride is used as a vulcanizing agent for other rubbers, particularly butadiene-styrene rubbers and natural rubber. However, in the case of the latter two materials, the vulcanizing effect is not as pronounced under the conditions stated as when one employs either the butadiene-acrylonitrile polymer or the chloroprene polymer.

What we claim as new and desire to secure by Letters Patent of the United States is:

1. A vulcanizable composition comprising (1) a synthetic rubber selected from the class consisting of (a) copolymers of a butadiene of the general formula

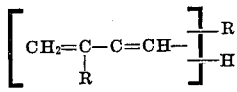

where R is a member selected from the class consisting of hydrogen and the methyl radical, and acrylonitrile and (b) a polymer of 2-chlorobutadiene-1,3, and (2) a vulcanizing agent for (1) comprising a minor proportion of a boron hydride.

2. A vulcanizable composition comprising (1) a copolymer of a butadiene of the general formula

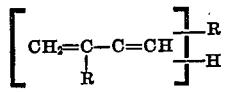

where R is a member selected from the class consisting of hydrogen and the methyl radical, and acrylonitrile and (2) a vulcanizing agent for (1) comprising a minor proportion of a boron hydride.

3. A vulcanizable composition comprising (1) a polymer of 2-chlorobutadiene-1,3 and (2) a vulcanizing agent for (1) comprising a minor proportion of a boron hydride.

4. A vulcanizable composition comprising (1) a copolymer of butadiene-1,3 and acrylonitrile and (2) a vulcanizing agent for (1) comprising a minor proportion of decaborane.

5. A vulcanizable composition comprising (1) a polymer of 2-chlorobutadiene-1,3 and (2) a vulcanizing agent for (1) comprising a minor proportion of decaborane.

6. The heat-treated product of claim 1.

7. The heat-treated product of claim 4.

8. The heat-treated product of claim 5.

9. A vulcanizable composition comprising (1) a synthetic rubber selected from the class consisting of (a) copolymers of a butadiene corresponding to the general formula

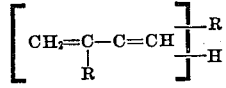

where R is a member selected from the class consisting of hydrogen and the methyl radical, and acrylonitrile and (b) a polymer of 2-chlorobutadiene-1,3, (2) a vulcanizing agent for (1) comprising a minor proportion of a boron hydride, and (3) a filler.

10. A vulcanizable composition comprising (1) a copolymer of butadiene-1,3 and acrylonitrile, (2) a vulcanizing agent for (1) comprising a minor proportion of decaborane, and (3) a filler comprising a carbon black.

11. A vulcanizable composition comprising (1) a polymer of 2-chlorobutadiene-1,3 (2) a vulcanizing agent for (1) comprising a minor proportion of decaborane, and (3) a filler comprising a carbon black.

12. The method which comprises (1) forming a mixture of ingredients comprising (a) a synthetic rubber selected from the class consisting of a polymer of 2-chlorobutadiene-1,3 and copolymers of a butadiene corresponding to general formula

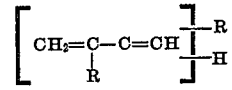

where R is a member selected from the class consisting of hydrogen and the methyl radical, and acrylonitrile, and (b) a vulcanizing agent for (a) comprising a minor proportion of a boron hydride, and (2) heating the aforesaid mixture for a time sufficient to effect vulcanization of the ingredients.

13. The method which comprises (1) forming a mixture of ingredients comprising (a) a copolymer of butadiene-1,3 and acrylonitrile, (b) a vulcanizing agent for (a) comprising decaborane, and (c) a filler comprising a minor proportion of a carbon black and (2) heating the mixture of ingredients for a time sufficient to cause vulcanization.

14. The method which comprises (1) forming a mixture of ingredients comprising (a) a polymer of 2-chlorobutadiene-1,3, (b) a vulcanizing agent for (a) comprising a minor proportion of decaborane, and (c) a filler comprising a carbon black and (2) heating the mixture of ingredients for a time sufficient to cause vulcanization.

DALLAS T. HURD.
MOYER M. SAFFORD.

No references cited.